United States Patent
Dong et al.

(10) Patent No.: US 11,071,017 B2
(45) Date of Patent: Jul. 20, 2021

(54) FORWARDING ENTRY GENERATION METHOD, CONTROLLER, AND NETWORK DEVICE

(71) Applicant: Huawei Technologies Co., Ltd., Shenzhen (CN)

(72) Inventors: Jie Dong, Beijing (CN); Guoyi Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 27 days.

(21) Appl. No.: 16/719,052

(22) Filed: Dec. 18, 2019

(65) Prior Publication Data

US 2020/0128445 A1 Apr. 23, 2020

Related U.S. Application Data

(63) Continuation of application No. PCT/CN2018/092324, filed on Jun. 22, 2018.

(30) Foreign Application Priority Data

Jun. 30, 2017 (CN) .......................... 201710527679.3

(51) Int. Cl.
*H04L 12/24* (2006.01)
*H04L 12/741* (2013.01)
(Continued)

(52) U.S. Cl.
CPC ......... *H04W 28/16* (2013.01); *H04L 41/0806* (2013.01); *H04L 41/0896* (2013.01);
(Continued)

(58) Field of Classification Search
CPC ..... H04L 41/02–5096; H04L 43/02–50; H04L 45/02–748; H04L 47/10–829;
(Continued)

(56) References Cited

U.S. PATENT DOCUMENTS

2014/0064281 A1 3/2014 Basso et al.
2014/0079076 A1 3/2014 Kamble et al.
(Continued)

FOREIGN PATENT DOCUMENTS

CN 104253767 A 12/2014
CN 106341832 A 1/2017
(Continued)

OTHER PUBLICATIONS

Machine Translation and Abstract of Chinese Publication No. CN104253767, Dec. 31, 2014, 25 pages.
(Continued)

*Primary Examiner* — Timothy J Weidner
(74) *Attorney, Agent, or Firm* — Conley Rose, P.C.

(57) ABSTRACT

A forwarding entry generation method includes sending, by a controller, a plurality of resource allocation request messages to a plurality of network devices in a network slice, to trigger the plurality of network devices to allocate resources, where the resource allocation request message includes an identifier of the network slice and a resource that needs to be allocated by a corresponding network device to the network slice; receiving, by the controller, a plurality of resource allocation response messages including the identifier of the network slice and a segment identifier of a corresponding network device, and a resource allocated by each device belongs to the network slice; and generating, by the controller, a forwarding table corresponding to the network slice, where the forwarding table includes a forwarding entry for arriving at a network device in the network slice.

20 Claims, 6 Drawing Sheets

(51) Int. Cl.

| | |
|---|---|
| *H04L 12/751* | (2013.01) |
| *H04L 12/911* | (2013.01) |
| *H04W 4/50* | (2018.01) |
| *H04W 16/04* | (2009.01) |
| *H04W 16/12* | (2009.01) |
| *H04W 28/02* | (2009.01) |
| *H04W 28/16* | (2009.01) |
| *H04W 28/26* | (2009.01) |
| *H04W 40/24* | (2009.01) |
| *H04W 48/18* | (2009.01) |
| *H04W 76/11* | (2018.01) |
| *H04W 76/25* | (2018.01) |
| *H04W 84/04* | (2009.01) |
| *H04W 88/12* | (2009.01) |
| *H04W 88/14* | (2009.01) |
| *H04W 88/18* | (2009.01) |
| *H04W 92/02* | (2009.01) |
| *H04W 92/14* | (2009.01) |
| *H04W 92/24* | (2009.01) |

(52) U.S. Cl.
CPC .............. *H04L 45/02* (2013.01); *H04L 45/54* (2013.01); *H04L 47/70* (2013.01); *H04L 47/78* (2013.01); *H04W 4/50* (2018.02); *H04W 16/04* (2013.01); *H04W 16/12* (2013.01); *H04W 28/021* (2013.01); *H04W 28/0268* (2013.01); *H04W 28/26* (2013.01); *H04W 40/246* (2013.01); *H04W 40/248* (2013.01); *H04W 48/18* (2013.01); *H04W 76/11* (2018.02); *H04W 76/25* (2018.02); *H04L 2212/00* (2013.01); *H04W 84/04* (2013.01); *H04W 88/12* (2013.01); *H04W 88/14* (2013.01); *H04W 88/18* (2013.01); *H04W 92/02* (2013.01); *H04W 92/14* (2013.01); *H04W 92/24* (2013.01)

(58) Field of Classification Search
CPC ......... H04L 69/02–40; H04L 2212/00; H04W 4/50–70; H04W 8/005–30; H04W 16/02–225; H04W 24/02–10; H04W 28/02–26; H04W 40/005–38; H04W 48/02–20; H04W 76/10–50; H04W 84/02; H04W 84/04–047; H04W 84/10–22; H04W 88/005–184; H04W 92/02–24
See application file for complete search history.

(56) References Cited

U.S. PATENT DOCUMENTS

| | | |
|---|---|---|
| 2015/0295822 A1 | 10/2015 | Sella |
| 2016/0359682 A1 | 12/2016 | Senarath et al. |
| 2017/0054595 A1 | 2/2017 | Zhang et al. |
| 2017/0054626 A1 | 2/2017 | Sivabalan et al. |
| 2018/0206152 A1 | 7/2018 | Zhang et al. |

FOREIGN PATENT DOCUMENTS

| | | |
|---|---|---|
| CN | 106341893 A | 1/2017 |
| CN | 106550410 A | 3/2017 |
| CN | 106713406 A | 5/2017 |
| WO | 2011032595 A1 | 3/2011 |

OTHER PUBLICATIONS

Machine Translation and Abstract of Chinese Publication No. CN106713406, May 24, 2017, 25 pages.
Previdi, S., Ed. et al., "BGP Link-State extensions for Segment Routing," draft-ietf-idr-bgp-ls-segment-routing-ext-01, Feb. 9, 2017, 36 pages.
Previdi, S., Ed. et al., "IS-IS Extensions for Segment Routing," draft-ietf-isis-segment-routing-extensions-11, Mar. 7, 2017, 41 pages.
Psenak, P., Ed. et al., "OSPF Extensions for Segment Routing," draft-ietf-ospf-segment-routing-extensions-12, Mar. 8, 2017, 35 pages.
Filsfils, C., Ed. et al., "Segment Routing Architecture," draft-ietf-spring-segment-routing-10, Nov. 19, 2016, 29 pages.
Filsfils, C., Ed. et al., "Segment Routing Architecture," draft-ietf-spring-segment-routing-11, Feb. 16, 2017, 28 pages.
Filsfils, C., Ed. et al., "Segment Routing Use Cases," draft-filsfils-rtgwg-segment-routing-use-cases-01, XP015094285, Jul. 14, 2013, 46 pages.
Hu, F., et al. "SPRING OpenFlow Interworking Requirements," draft-khc-spring-openflow-interworking-req-01, XP015105562, Mar. 9, 2015, 11 pages.
Dong, J., et al. "Problem Statement of Network Slicing in IP/MPLS Networks," draft-dong-network-slicing-problem-statement-00, XP015116291, Oct. 31, 2016, 10 pages.
Qiang, L, Ed. et al., "Gap Analysis for Network Slicing," draft-qiang-netslices-gap-analysis-00, Jun. 2, 2017, XP015119927, 30 pages.
Foreign Communication From a Counterpart Application, European Application No. 18823862.0, Extended European Search Report dated Feb. 27, 2020, 15 pages.
Foreign Communication From a Counterpart Application, PCT Application No. PCT/CN2018/092324, English Translation of International Search Report dated Sep. 18, 2018, 2 pages.
Foreign Communication From a Counterpart Application, PCT Application No. PCT/CN2018/092324, English Translation of Written Opinion dated Sep. 18, 2018, 4 pages.

A first network device obtains a resource allocation request message, where the resource allocation request message includes an identifier of a network slice and a resource that needs to be allocated by the first network device

301

The first network device allocates a device processing resource based on the resource allocation request message, and allocates a segment identifier, where the allocated resource belongs to the network slice

302

The first network device sends an advertisement message to a second network device, to trigger the second network device to generate, based on the advertisement message, a forwarding table corresponding to the network slice, where the advertisement message includes the identifier of the network slice and the segment identifier, the forwarding table includes a forwarding entry for arriving at a network device in the network slice, and the forwarding entry includes a segment identifier of arriving at a destination network device in the forwarding entry

A first network device receives a plurality of advertisement messages sent by a plurality of network devices in a network slice, where the plurality of advertisement messages are in a one-to-one correspondence with the plurality of network devices, and the advertisement message includes an identifier of the network slice and a segment identifier of a corresponding network device

401

The first network device generates, based on the plurality of advertisement messages, a forwarding table corresponding to the network slice, where an identifier of the forwarding table is the identifier of the network slice, the forwarding table includes a forwarding entry for arriving at an egress network device in the network slice, and the forwarding entry includes a segment identifier of arriving at a destination network device in the forwarding entry

FORWARDING ENTRY GENERATION METHOD, CONTROLLER, AND NETWORK DEVICE

CROSS-REFERENCE TO RELATED APPLICATIONS

This is a continuation of Int'l Patent App. No. PCT/CN2018/092324 filed on Jun. 22, 2018, which claims priority to Chinese Patent App. No. 201710527679.3 filed on Jun. 30, 2017, which are incorporated by reference.

TECHNICAL FIELD

The present disclosure relates to the communications field, and in particular, to a forwarding entry generation method, controller, and network device.

BACKGROUND

A 5th generation (5G) mobile network is intended to enhance capabilities of the network in various aspects, to support a variety of new services, for example, virtual reality (VR), augmented reality (AR), remote industrial control, automated driving, and internet of things. Because different types of services impose greatly different requirements on the network, network slicing is proposed in 5G, to divide a same physical network into different logical network slices, to meet differentiated requirements of different services. For a carrier network, the network slicing requires that the carrier network provides network connections meeting a user requirement and different service requirements for a core network, an access network, and various service functions. A key requirement is that the carrier network provides different guaranteed quality of service for different network slices, and isolates the slices. This requires that the carrier network allocates dedicated network resources to different network slices, and isolates the different network slices. However, the 5G technology does not provide a specific technical solution to implement a flexible packet forwarding manner based on network slice resource isolation.

SUMMARY

This application provides a forwarding entry generation method, controller, and network device, to help provide a flexible packet forwarding manner based on network slice resource isolation for a user.

According to a first aspect, a forwarding entry generation method is provided, including: sending, by a controller, a plurality of resource allocation request messages to a plurality of network devices in a network slice, to trigger each of the plurality of network devices to allocate a resource based on a corresponding resource allocation request message, where the plurality of resource allocation request messages are in a one-to-one correspondence with the plurality of network devices, the resource allocation request message includes an identifier of the network slice and a resource that needs to be allocated by a corresponding network device to the network slice, and the resource includes a device processing resource and/or a link resource; receiving, by the controller, a plurality of resource allocation response messages sent by the plurality of network devices, where the plurality of resource allocation response messages are in a one-to-one correspondence with the plurality of network devices, the resource allocation response message includes the identifier of the network slice and a segment identifier of a corresponding network device, the segment identifier is used to identify a resource allocated by the corresponding network device to the network slice, the segment identifier includes a node segment identifier and/or an adjacency segment identifier, and the resource allocated by each of the plurality of network devices belongs to the network slice; and generating, by the controller based on the plurality of resource allocation response messages, a forwarding table corresponding to the network slice, where an identifier of the forwarding table is the identifier of the network slice, the forwarding table includes a forwarding entry for arriving at a network device in the network slice, and the forwarding entry includes a segment identifier of a network device on a path of arriving at a destination network device in the forwarding entry.

In the foregoing technical solution, the controller may instruct, based on the resource allocation request message, the network device in the network slice to allocate the resource and bind the allocated resource to the network slice, the network slice may use the network resource, and each network device allocates the segment identifier corresponding to the allocated network resource. In this way, the controller can establish, based on the resource allocation response message sent by each network device, the forwarding table corresponding to the network slice, to help provide a flexible packet forwarding manner based on network slice resource isolation for a user. The technical solution helps implement packet forwarding in a particular network slice. In addition, a network device may process a packet based on a segment identifier included in the packet and by using a resource allocated to the network slice. Therefore, the flexible packet forwarding manner based on network slice resource isolation can be implemented.

In a possible implementation, before the sending, by a controller, a plurality of resource allocation request messages to a plurality of network devices in a network slice, the method further includes: obtaining, by the controller, the network slice from a network based on a service requirement, where the network slice includes the plurality of network devices, and the service requirement includes a topology requirement and/or a requirement of a user on quality of service.

In a possible implementation, the method further includes: sending, by the controller, the forwarding table to a network device in the network slice. The forwarding table is sent to the network device in the network slice, so that when a packet enters the network slice through the network device, the network device implements packet forwarding based on network slice resource isolation.

In a possible implementation, the device processing resource includes one or more of the following resources: a queue, a memory, a processor, and a network function; and the link resource includes one or more of the following resources: bandwidth, a timeslot, or a sub-interface.

According to a second aspect, a forwarding entry generation method is provided, including: obtaining, by a first network device, a resource allocation request message, where the resource allocation request message includes an identifier of a network slice and a resource that needs to be allocated by the first network device to the network slice, and the resource includes a device processing resource and/or a link resource; allocating, by the first network device, the resource based on the resource allocation request message, and allocating a segment identifier, where the segment identifier is used to identify the resource allocated by the first network device to the network slice, the allocated resource belongs to the network slice, the allocated resource includes the device processing resource and/or the link resource, and the segment identifier includes a node segment identifier and/or an adjacency segment identifier; and sending, by the first network device, an advertisement message to a second network device, to trigger the second network device to generate, based on the advertisement message, a forwarding table corresponding to the network slice, where the advertisement message includes the identifier of the network slice and the segment identifier, the forwarding table includes a forwarding entry for arriving at a network device in the network slice, and the forwarding entry includes a segment identifier of a network device on a path of arriving at a destination network device in the forwarding entry.

The first network device allocates the resource based on the resource allocation request message, and binds the allocated resource to the network slice, the network slice may use the network resource, and the first network device allocates the segment identifier corresponding to the network slice. In this way, the second network device may be triggered to establish, based on the resource allocation response message sent by each network device, the forwarding table corresponding to the network slice, to help provide a flexible packet forwarding manner based on network slice resource isolation for a user.

In a possible implementation, the second network device is a controller, and the method further includes: receiving, by the first network device, the forwarding table sent by the second network device, and receiving, by the first network device, a first packet, where the first packet belongs to the forwarding table; searching, by the network device, the forwarding table for a matched forwarding entry based on a destination Internet Protocol (IP) address of the first packet, where there is a correspondence between a destination IP address in the forwarding entry and the destination IP address of the first packet; inserting, by the network device, the segment identifier in the forwarding entry into a packet header of the first packet to generate a second packet; and sending, by the network device, the second packet to a network device corresponding to a next hop in the forwarding entry.

According to a third aspect, a forwarding entry generation method is provided, including: receiving, by a first network device, a plurality of advertisement messages sent by a plurality of network devices in a network slice, where the plurality of advertisement messages are in a one-to-one correspondence with the plurality of network devices, the advertisement message includes an identifier of the network slice and a segment identifier of a corresponding network device, the segment identifier is used to identify a resource allocated by the corresponding network device to the network slice, the segment identifier includes a node segment identifier and/or an adjacency segment identifier, and the first network device is a network device in the network slice; and generating, by the first network device based on the plurality of advertisement messages, a forwarding table corresponding to the network slice, where an identifier of the forwarding table is the identifier of the network slice, the forwarding table includes a forwarding entry for arriving at a network device in the network slice, and the forwarding entry includes a segment identifier of a network device on a path of arriving at a destination network device in the forwarding entry.

The first network device is used as an ingress node of the network slice, and selects a proper network slice by using the forwarding table, to forward a packet, and an intermediate node in the network slice does not need to be aware of network slice information related to the packet, so that packet forwarding is more flexible.

In a possible implementation, the method further includes: receiving, by the first network device, a first packet, where the first packet belongs to the forwarding table; searching, by the first network device, the forwarding table for a matched forwarding entry based on a destination IP address of the first packet, where there is a correspondence between a destination IP address in the forwarding entry and the destination IP address of the first packet; inserting, by the first network device, the segment identifier in the forwarding entry into a packet header of the first packet to generate a second packet; and sending, by the first network device, the second packet to a network device corresponding to a next hop in the forwarding entry.

According to a fourth aspect, a forwarding entry generation controller is provided, configured to perform the method in the first aspect or any possible implementation of the first aspect. Specifically, the controller includes units configured to perform the method in the first aspect or any possible implementation of the first aspect.

According to a fifth aspect, a first network device for generating a forwarding entry is provided, configured to perform the method in the second aspect or any possible implementation of the second aspect. Specifically, the first network device includes units configured to perform the method in the second aspect or any possible implementation of the second aspect.

According to a sixth aspect, a first network device for generating a forwarding entry is provided, configured to perform the method in the third aspect or any possible implementation of the third aspect. Specifically, the first network device includes units configured to perform the method in the third aspect or any possible implementation of the third aspect.

According to a seventh aspect, a network device is provided. The network device includes a processor, a network interface, and a memory. The memory may be configured to store program code, and the processor is configured to invoke the program code in the memory to perform the method designed in the foregoing aspect. For specific execution steps, refer to the foregoing aspect. Details are not described herein again.

According to an eighth aspect, a network device is provided. The network device includes a main control board and an interface board. The main control board includes a first processor and a second memory. The interface board includes a second processor, a second memory, and an interface card. The main control board is coupled to the interface board. The first memory may be configured to store program code, and the first processor is configured to invoke the program code in the first memory to perform the following operations: obtaining a resource allocation request message, where the resource allocation request message includes an identifier of a network slice and a resource that needs to be allocated by a first network device to the network slice, and the resource includes a device processing resource and/or a link resource; and allocating the resource based on the resource allocation request message, and allocating a segment identifier, where the segment identifier is used to identify the resource allocated by the first network device to the network slice, the allocated resource includes the device processing resource and/or the link resource, the segment identifier includes a node segment identifier and/or an adjacency segment identifier, and the allocated resource belongs to the network slice.

The second memory may be configured to store program code, and the second processor is configured to invoke the program code in the second memory to perform the following operations: triggering the interface card to send an advertisement message to a second network device, to trigger the second network device to generate, based on the advertisement message, a forwarding table corresponding to the network slice, where the advertisement message includes the identifier of the network slice and the segment identifier, the forwarding table includes a forwarding entry for arriving at a network device in the network slice, and the forwarding entry includes a segment identifier of a network device on a path of arriving at a destination network device in the forwarding entry.

In a possible implementation, an inter-process communication (IPC) control channel is established between the main control board and the interface board.

According to a ninth aspect, a computer storage medium is provided, configured to store a computer software instruction used by the foregoing controller or the foregoing network device, where the computer software instruction includes a program designed for executing the foregoing aspect.

BRIEF DESCRIPTION OF DRAWINGS

To describe the technical solutions in the present disclosure more clearly, the following briefly describes the accompanying drawings used in the embodiments. The accompanying drawings in the following description merely show some embodiments of the present disclosure, and a person of ordinary skill in the art can derive other technical solutions and accompanying drawings from these accompanying drawings without creative efforts.

FIG. 3 is a schematic flowchart of a forwarding entry generation method according to an embodiment of the present disclosure;

FIG. 4 is a schematic flowchart of a forwarding entry generation method according to an embodiment of the present disclosure;

DESCRIPTION OF EMBODIMENTS

The following describes the embodiments of the present disclosure with reference to the accompanying drawings.

The embodiments of the present disclosure provide a forwarding entry generation method and a network device based on the method, to allocate a resource to a network slice, and implement a flexible packet forwarding manner based on the network slice. The method and the network device are based on a same concept. Because problem-resolving principles of the method and the network device are similar, mutual reference may be made between implementation of the network device and implementation of the method, and no repeated description is provided.

Figure 1:
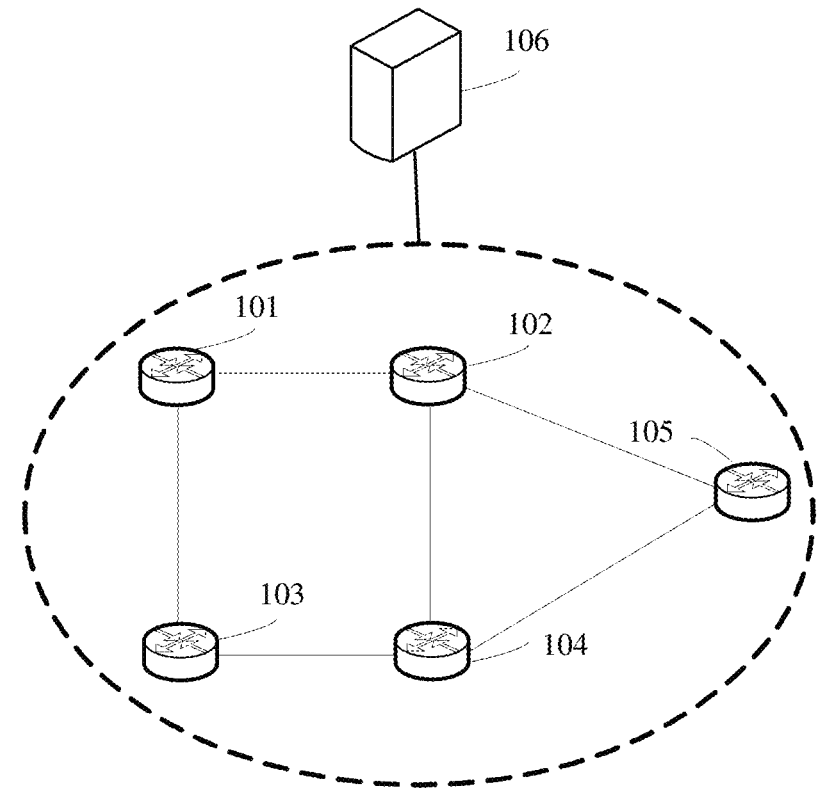
FIG. 1 is a schematic diagram of an application scenario according to an embodiment of the present disclosure.

FIG. 1 shows a possible application scenario according to an embodiment of the present disclosure. In the application scenario, a network device 101, a network device 102, a network device 103, a network device 104, and a network device 105 form a physical network. A controller 106 controls and manages the network topology. The controller 106 may be a network management device or a controller in a software-defined networking (SDN) architecture. Each of the network devices 101-105 may be a router or a switch, or may be a forwarder in the SDN architecture. A network slice in this embodiment of the present disclosure is a logical network that is formed by selecting some or all network devices in an actual physical network. For example, in FIG. 1, the network device 101 to the network device 105 form an actual physical network, and the network device 101, the network device 102, the network device 103, the network device 104, and the network device 105 may form a network slice, for example, a network slice A. In this case, the network slice A is an actual physical network topology formed by the network device 101 to the network device 105. The network device 101, the network device 102, the network device 103, and the network device 104 may form a network slice, for example, a network slice B. The network device 101, the network device 102, the network device 104, and the network device 105 may form a network slice, for example, a network slice C. Different network slices have different network slice identifiers.

Figure 2:
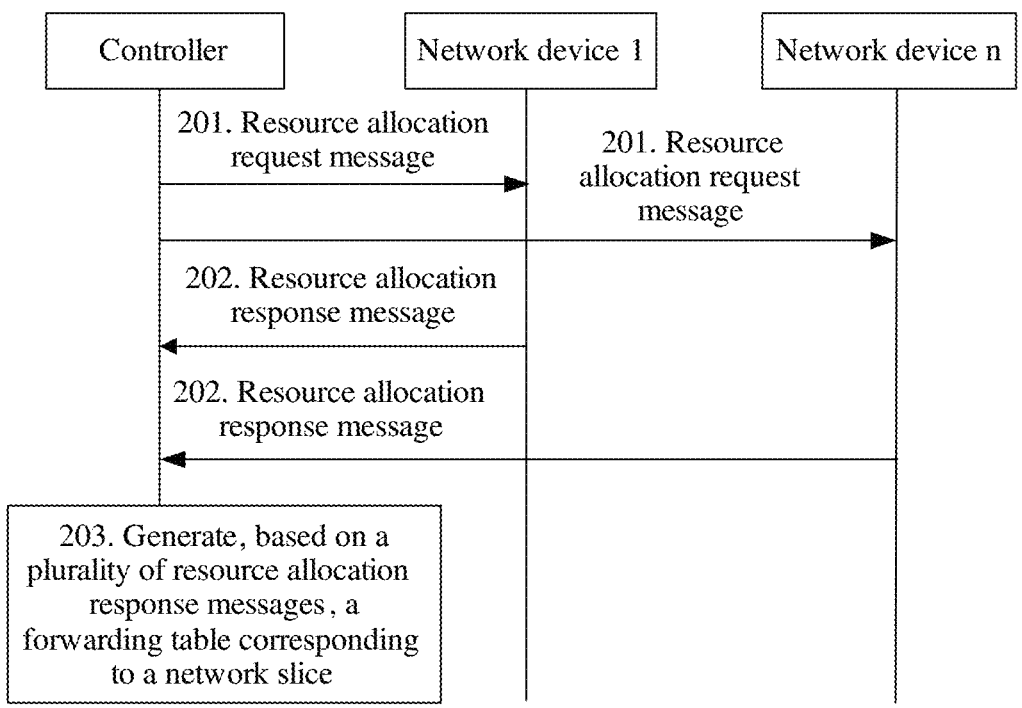
FIG. 2 is a schematic flowchart of a forwarding entry generation method according to an embodiment of the present disclosure.

With reference to the application scenario shown in FIG. 1, referring to FIG. 2, an embodiment of the present disclosure provides a forwarding entry generation method. The method includes the following steps.

201. A controller sends a plurality of resource allocation request messages to a plurality of network devices in a network slice, to trigger each of the plurality of network devices to allocate a resource based on a corresponding resource allocation request message, where the plurality of resource allocation request messages are in a one-to-one correspondence with the plurality of network devices, the resource allocation request message includes an identifier of the network slice and a resource that needs to be allocated by a corresponding network device to the network slice, and the resource includes a device processing resource and/or a link resource. The plurality of network devices include a network device 1 to a network device n in FIG. 2.

In a possible implementation, before the sending, by a controller, a plurality of resource allocation request messages to a plurality of network devices in a network slice, the method further includes: obtaining, by the controller, the network slice from a network based on a service requirement, where the network slice includes the plurality of network devices. The service requirement includes a topology requirement and/or a requirement of a user on quality of service (QoS). The service requirement may be customized by an operator or the user. Optionally, the topology requirement specifically means that when the network is divided into network slices, actual locations of specific network devices or current load statuses of the network devices need to be considered to select particular network devices to form a network slice. For example, based on the scenario shown in FIG. 1, because a geographical location of the network device 103 is in a war zone and reliability cannot be guaranteed, an operator needs to exclude the network device 103 from a network formed by the network device 101 to the network device 105. Correspondingly, an obtained network slice specifically includes the network device 101, the network device 102, the network device 104, and the network device 105. Optionally, the requirement on quality of service specifically means that some network devices having strong processing capabilities are selected, and some network devices having high resource occupation rates are excluded, to ensure quality of service of a service. For example, based on the scenario shown in FIG. 1, the network device 104 has relatively good device performance and a relatively strong processing capability, and when a network slice is obtained, the network device 104 is selected as a network device in the network slice; and a resource occupation rate of the network device 102 is above 90%, and when the network slice is obtained, the network device 102 is not selected. Therefore, the finally determined network slice includes the network device 101, the network device 103, the network device 104, and the network device 105.

202. The controller receives a plurality of resource allocation response messages sent by the plurality of network devices, where the plurality of resource allocation response messages are in a one-to-one correspondence with the plurality of network devices, the resource allocation response message includes the identifier of the network slice and a segment identifier of a corresponding network device, the segment identifier is used to identify a resource allocated by the corresponding network device to the network slice, the segment identifier includes a node segment identifier and/or an adjacency segment identifier, the resource allocated by each of the plurality of network devices belongs to the network slice, and the allocated resource includes the device processing resource and/or the link resource. The node segment identifier is used to identify the allocated device processing resource, and the adjacency segment identifier is used to identify the allocated link resource.

203. The controller generates, based on the plurality of resource allocation response messages, a forwarding table corresponding to the network slice, where an identifier of the forwarding table is the identifier of the network slice, the forwarding table includes a forwarding entry for arriving at a network device in the network slice, and the forwarding entry includes a segment identifier of a network device on a path of arriving at a destination network device in the forwarding entry.

When receiving the corresponding resource allocation request message, each of the plurality of network devices allocates the resource based on the resource that needs to be allocated to the network slice and that is included in the resource allocation request message. Optionally, the forwarding table may include a forwarding entry for arriving at each network device in the network slice or a forwarding entry of an egress network device.

In a possible implementation, the device processing resource includes one or more of the following resources: a queue, a memory, a processor, and a network function. Correspondingly, that a network device allocates a device processing resource includes: the network device allocates a part of an overall queue of the device to the network slice, or allocates some of a plurality of processors to the network slice, or allocates a part of an overall memory to the network slice. In addition, the network device may divide some network functions from supported network functions. The some network functions may be implemented in the network slice. Specifically, the network device supports functions such as a firewall function, a deep packet inspection (DPI) function, and a network address translation (NAT) function, and may allocate the firewall function to the network slice. In other words, firewall processing may be performed when a packet passes through the network slice.

In a possible implementation, the link resource includes one or more of the following resources: bandwidth, a timeslot, or a sub-interface. Correspondingly, that a network device allocates a link resource includes: the network device allocates a part of total link bandwidth to the network slice, or allocates a part of a timeslot to the network slice, or allocates some of all sub-interfaces to the network slice.

In a possible implementation, a network device binds a node segment identifier (SID) of the network device to an allocated device processing resource. In this way, when a received packet includes the node segment identifier, the network device may determine that a device resource corresponding to the node segment identifier needs to be used to process the packet. Optionally, a network device binds an adjacency SID (Adj SID) of the network device to an allocated link resource, and when a received packet includes the adjacency segment identifier, the network device may determine that a link resource corresponding to the adjacency segment identifier needs to be used to process the packet. For definitions of the node SID and the Adj SID, refer to a draft related to segment routing (SR) disclosed in the Internet Engineering Task Force (IETF), for example, draft-ietf-spring-segment-routing-11, which is incorporated by reference.

After receiving the resource allocation response messages, the controller may establish, based on the identifier of the network slice in the resource allocation response messages and the segment identifier of the corresponding network device, the forwarding table corresponding to the network slice. An identifier or an index of the forwarding table is the identifier of the network slice.

In a possible implementation, the method further includes: sending, by the controller, the forwarding table to a network device in the network slice. After receiving the forwarding table, the network device in the network slice stores the forwarding table, and may select the forwarding table according to a matching policy when receiving a packet, and forward or process the packet by using the network slice. The network device 1 in FIG. 2 may be an ingress network device.

In the foregoing technical solution, the controller may instruct, based on the resource allocation request message, the network device in the network slice to allocate the resource and bind the allocated resource to the network slice, the network slice may use the network resource, and each network device allocates the segment identifier corresponding to the network slice. In this way, the controller can establish, based on the resource allocation response message sent by each network device, the forwarding table corresponding to the network slice, to help provide a flexible packet forwarding manner based on network slice resource isolation for the user. The technical solution helps implement packet forwarding in a particular network slice. In addition, a network device may process a packet based on a segment identifier included in the packet and by using a resource allocated to the network slice. Therefore, the packet forwarding manner based on network slice resource isolation can be implemented.

Referring to FIG. 3, an embodiment of the present disclosure provides a forwarding entry generation method. The method includes the following steps.

301. A first network device obtains a resource allocation request message, where the resource allocation request message includes an identifier of a network slice and a resource that needs to be allocated by the first network device to the network slice, and the resource includes a device processing resource and/or a link resource. The first network device may be the network device 1 in the embodiment shown in FIG. 2.

302. The first network device allocates the resource based on the resource allocation request message, and allocates a segment identifier, where the segment identifier is used to identify the resource allocated by the first network device to the network slice, the allocated resource belongs to the network slice, the allocated resource includes the device processing resource and/or the link resource, and the segment identifier includes a node segment identifier and/or an adjacency segment identifier.

303. The first network device sends an advertisement message to a second network device, to trigger the second network device to generate, based on the advertisement message, a forwarding table corresponding to the network slice, where the advertisement message includes the identifier of the network slice and the segment identifier, the forwarding table includes a forwarding entry for arriving at a network device in the network slice, and the forwarding entry includes a segment identifier of a network device on a path of arriving at a destination network device in the forwarding entry.

In a possible implementation, the second network device is the controller in FIG. 1 or FIG. 2, the first network device is a network device in the network slice, and the method further includes: receiving, by the first network device, the forwarding table sent by the second network device; receiving, by the first network device, a first packet, where the first packet belongs to the forwarding table; searching, by the network device, the forwarding table for a matched forwarding entry based on a destination IP address of the first packet, where there is a correspondence between a destination IP address in the forwarding entry and the destination IP address of the first packet; inserting, by the network device, the segment identifier in the forwarding entry into a packet header of the first packet to generate a second packet; and sending, by the network device, the second packet to a network device corresponding to a next hop in the forwarding entry.

In a possible implementation, the obtaining, by a first network device, a resource allocation request message includes: receiving, by the first network device, the resource allocation request message sent by a controller, where the controller may be the second network device.

In a possible implementation, the obtaining, by a first network device, a resource allocation request message includes: receiving, by the first network device, the resource allocation request message sent by another network device in the network slice.

The first network device allocates the resource based on the resource allocation request message, and binds the allocated resource to the network slice, the network slice may use the network resource, and the first network device allocates the segment identifier corresponding to the allocated resource. In this way, the second network device may be triggered to establish, based on the resource allocation response message sent by each network device, the forwarding table corresponding to the network slice, to help provide a flexible packet forwarding manner based on network slice resource isolation for a user.

Referring to FIG. 4, an embodiment of the present disclosure provides a forwarding entry generation method. The method includes the following steps.

401. A first network device receives a plurality of advertisement messages sent by a plurality of network devices in a network slice, where the plurality of advertisement messages are in a one-to-one correspondence with the plurality of network devices, the advertisement message includes an identifier of the network slice and a segment identifier of a corresponding network device, the segment identifier is used to identify a resource allocated by the corresponding network device to the network slice, the segment identifier includes a node segment identifier and/or an adjacency segment identifier, and the first network device is a network device in the network slice.

402. The first network device generates, based on the plurality of advertisement messages, a forwarding table corresponding to the network slice, where an identifier of the forwarding table is the identifier of the network slice, the forwarding table includes a forwarding entry for arriving at a network device in the network slice, and the forwarding entry includes a segment identifier of a network device on a path of arriving at a destination network device in the forwarding entry.

In a possible implementation, in step 402, the first network device may alternatively generate a plurality of forwarding entries based on the plurality of advertisement messages, where the plurality of forwarding entries are in a one-to-one correspondence with the advertisement messages. Each forwarding entry includes the identifier of the network slice and a segment identifier of a network device sending the advertisement message.

In a possible implementation, the method further includes: receiving, by the first network device, a first packet, where the first packet belongs to the forwarding table; searching, by the first network device, the forwarding table for a matched forwarding entry based on a destination IP address of the first packet, where there is a correspondence between a destination IP address in the forwarding entry and the destination IP address of the first packet; inserting, by the first network device, the segment identifier in the forwarding entry into a packet header of the first packet to generate a second packet; and sending, by the first network device, the second packet to a network device corresponding to a next hop in the forwarding entry.

In a possible implementation, that there is a correspondence between a destination IP address in the forwarding entry and the destination IP address of the first packet specifically includes: the destination IP address in the forwarding entry may be the same as the destination IP address of the first packet. In this case, a network device corresponding to the destination address of the first packet is a network device corresponding to the destination address in the forwarding entry.

In a possible implementation, that there is a correspondence between a destination IP address in the forwarding entry and the destination IP address of the first packet specifically includes: the destination IP address in the forwarding entry may be different from the destination IP address of the first packet, but the correspondence is pre-established. In this case, it indicates that a network device corresponding to the destination address in the forwarding entry is one hop on a path through which the first packet arrives at a destination network device, that is, an edge device in the network slice. After the first packet arrives at the network device corresponding to the destination address in the forwarding entry, the network device further needs to forward the packet in a conventional forwarding manner.

In a possible implementation, that there is a correspondence between a destination IP address in the forwarding entry and the destination IP address of the first packet specifically includes: the destination IP address of the first packet belongs to a network segment corresponding to the destination IP address in the forwarding entry.

In a possible implementation, a forwarding policy is preconfigured on the first network device. When the first packet is received, a forwarding table to which the first packet belongs may be determined through matching based on information about the first packet and the forwarding policy. The forwarding policy includes a match item and a result item. For example, the match item includes the destination IP address or a source IP address of the first packet, and the result item includes the identifier of the network slice. Determining, according to the forwarding policy, the forwarding table to which the first packet belongs includes: when it is determined that the destination IP address of the first packet matches the match item in the forwarding policy, determining the corresponding forwarding table by using the identifier of the network slice included in the result item, to be specific, selecting the forwarding table whose identifier is the identifier of the network slice.

Optionally, the match item in the forwarding policy may include information about a port for receiving a packet. Determining, according to the forwarding policy, the forwarding table to which the first packet belongs includes: when it is determined that an ingress port of receiving the first packet matches the match item in the forwarding policy, determining the corresponding forwarding table by using the identifier of the network slice included in the result item.

When a packet enters the network slice through the first network device, the first network device selects a proper network slice by using the forwarding table, and forwards or processes the packet by using the resource of the network slice, and an intermediate node in the network slice does not need to forward the packet according to the forwarding policy, and only needs to forward the packet based on a segment identifier carried in the packet, so that packet forwarding is more flexible.

Figure 5:
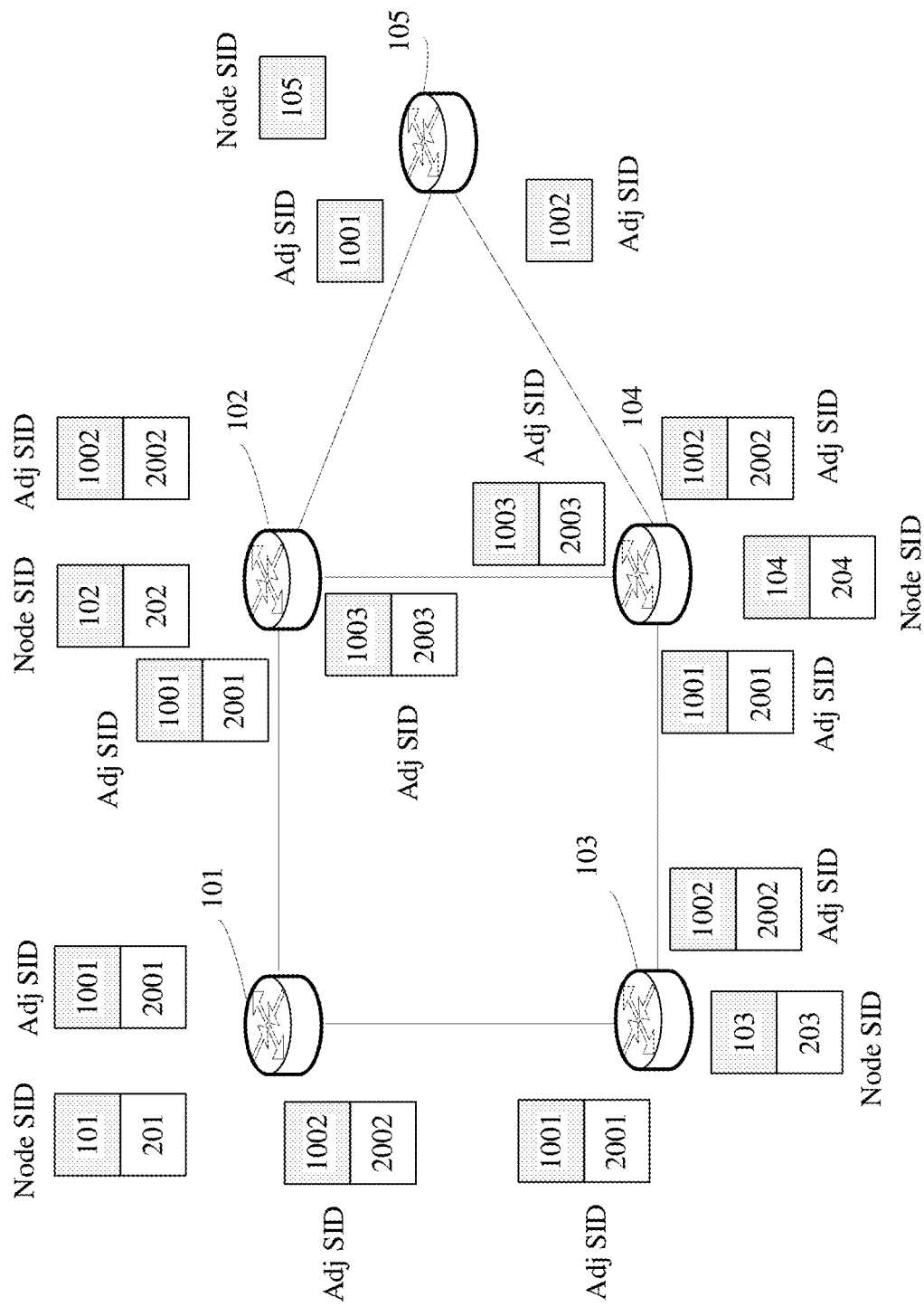
FIG. 5 is a schematic diagram of an application scenario according to an embodiment of the present disclosure.

The foregoing method embodiment is described by way of example with reference to a scenario shown in FIG. 5. In FIG. 5, a node segment identifier and an adjacency segment identifier allocated by each network device are marked based on the scenario shown in FIG. 1. In FIG. 5, each of the network device 101, the network device 102, the network device 103, the network device 104, and the network device 105 receives a first resource allocation request message sent by a controller, where an identifier of a network slice included in the first resource allocation request message is A. Each of the network device 101, the network device 102, the network device 103, and the network device 104 further receives a second resource allocation request message, where an identifier of a network slice included in the second resource allocation request message is B. In other words, the network device 101 to the network device 104 belong to both the network slice A and the network slice B, and the network device 105 belongs to only the network slice A.

A node SID allocated by the network device 101 to the network slice A is 101, a node SID allocated by the network device 101 to the network slice B is 201. In other words, the network device 101 allocates different node SIDs to different network slices. In FIG. 5, the network device 101 is connected to the network device 102 through one link, and is connected to the network device 103 through another link. Therefore, Adj SIDs that are allocated by the network device 101 to the network slice A and that correspond to the two links are 1001 and 1002, and Adj SIDs allocated by the network device 101 to the network slice B are 2001 and 2002. Similarly, a node SID allocated by the network device 102 to the network slice A is 102, a node SID allocated by the network device 102 to the network slice B is 202, Adj SIDs allocated by the network device 102 to the network slice A are 1001, 1002, and 1003, and Adj SIDs allocated by the network device 102 to the network slice B are 2001, 2002, and 2003. A node SID allocated by the network device 103 to the network slice A is 103, a node SID allocated by the network device 103 to the network slice B is 203, Adj SIDs allocated by the network device 103 to the network slice A are 1001 and 1002, and Adj SIDs allocated by the network device 103 to the network slice B are 2001 and 2002. A node SID allocated by the network device 104 to the network slice A is 104, a node SID allocated by the network device 104 to the network slice B is 204, Adj SIDs allocated by the network device 104 to the network slice A are 1001, 1002, and 1003, and Adj SIDs allocated by the network device 104 to the network slice B are 2001, 2002, and 2003. A node SID allocated by the network device 105 to the network slice A is 105, and Adj SIDs allocated by the network device 105 to the network slice A are 1001 and 1002.

Optionally, node SIDs vary with different network devices in a same network slice, and node SIDs in different network slices may be the same or may be different. Adj SIDs corresponding to different links in a same network slice are different, and Adj SIDs corresponding to different links in different network devices may be the same.

Optionally, the network device 101 to the network device 105 send the allocated node SIDs and/or Adj SIDs to the controller, the controller separately generates a forwarding table A corresponding to the network slice A and a forwarding table B corresponding to the network slice B, and then the controller sends the forwarding table A and the forwarding table B to a network device in a network slice, for example, sends the forwarding table A and the forwarding table B to the network device 101. Optionally, each of the network device 101 to the network device 105 advertises the allocated node SIDs and/or Adj SIDs to another network device in the network slice by using an advertisement message, and correspondingly, network devices belonging to a same network slice separately establish a forwarding table belonging to the network slice. For example, the network device 101 receives advertisement messages sent by the network device 102 to the network device 105, and then establishes the forwarding table A corresponding to the network slice A and the forwarding table B corresponding to the network slice B. For example, an identifier or an index of the forwarding table A is an identifier of the network device A. The forwarding table A includes a forwarding entry for arriving at a network device in the network slice A. For example, the forwarding table A includes a forwarding entry for arriving at the network device 105, and an index of the forwarding entry is an IP address of the network device 105. The forwarding table further includes a node SID of a network device on a path of arriving at the network device 105, or includes a node SID and an Adj SID of a network device on a path of arriving at the network device 105.

Optionally, when a packet forwarding manner in the network slice A is a strict designated forwarding path, the forwarding table includes a node SID and an Adj SID on a path of arriving at a destination network device. For example, a forwarding path included in a forwarding entry is from the network device 101 to the network device 105, and the forwarding path passes through the network device 102, the network device 104, and the network device 105. In this case, the forwarding entry includes the node SID 102, the Adj SID 1003, the node SID 104, the Adj SID 1002, and the node SID 105.

Optionally, when a packet forwarding manner in the network slice A is a strict designated forwarding path, the forwarding table includes an Adj SID on a path of arriving at a destination network device. For example, a forwarding path included in a forwarding entry is from the network device 101 to the network device 105, and the forwarding path passes through the network device 102, the network device 104, and the network device 105. In this case, the forwarding entry includes the Adj SID 1003 and the Adj SID 1002.

Optionally, when a packet forwarding manner in the network slice A is a loose forwarding path, the forwarding table includes a node SID on a path of arriving at a destination network device. For example, a forwarding path included in a forwarding entry F is from the network device 101 to the network device 105, and the forwarding path passes through the network device 102, the network device 104, and the network device 105. In this case, the forwarding entry may include the node SID 102 and the node SID 105, or the forwarding entry includes the node SID 104 and the node SID 105. Specifically, the forwarding path from the network device 101 to the network device 105 needs to pass through the network device 102. In this case, the forwarding entry includes a node SID of an intermediate network device and a node SID of a tail network device, for example, the node SID 102 and the node SID 105.

Optionally, when a packet forwarding manner in the network slice A is a loose forwarding path, the forwarding table includes an Adj SID on a path of arriving at a destination network device. For example, a forwarding path included in a forwarding entry F is from the network device 101 to the network device 105, and the forwarding path passes through the network device 102, the network device 104, and the network device 105. In this case, the forwarding entry may include the Adj SID 1003 and the Adj SID 1002. Optionally, the forwarding entry may include the Adj SID 1001 and the Adj SID 1002.

When receiving a first packet, the network device 101 obtains a source IP address of the first packet, determines, according to a forwarding policy, that a packet whose source address is the IP address needs to be forwarded by using the network slice A, and then searches the forwarding table A for a matched forwarding entry based on a destination IP address of the first packet. For example, the destination IP address of the first packet is an address of the network device 105. In this case, the matched forwarding entry is the forwarding entry F. When a packet forwarding manner in the network slice A is a strict designated forwarding path, the node SID 102, the Adj SID 1003, the node SID 104, the Adj SID 1002, and the node SID 105 in the forwarding entry F are encapsulated into a header of the first packet to obtain a second packet. When a packet forwarding manner in the network slice A is a loose forwarding path, the node SID 102 and the node SID 105 in the forwarding entry F are encapsulated into a header of the first packet to obtain a second packet. Then, the network device 101 sends the second packet to a network device corresponding to a next hop in the forwarding entry F. When receiving the second packet, the network device 102 determines that a packet header of the second packet includes the node SID 102 and the Adj SID 1003, and then considers that the packet needs to be processed by the network device 102. When processing the second packet, the network device 102 uses a device processing resource bound to the node SID 102, and when forwarding the second packet, uses a link resource bound to the Adj SID 1003. That is, the network device 102 processes and forwards the second packet by using a resource in the network slice A. Before forwarding the second packet to the network device 104, the network device 102 removes the Node SID 102 and the Adj SID 1003 in the packet header to generate a third packet, and then sends the third packet to the network device 104. When receiving the third packet, the network device 104 determines that a packet header of the third packet includes the node SID 104 and the Adj SID 1002, and then considers that the packet needs to be processed by the network device 104. When processing the third packet, the network device 104 uses a device processing resource bound to the node SID 104, and when forwarding the third packet, uses a link resource bound to the Adj SID 1002. Before forwarding the third packet to the network device 105, the network device 104 removes the SID 104 and the Adj SID 1002 in the packet header to generate a fourth packet, and then sends the fourth packet to the network device 105. When receiving the fourth packet, the network device 105 determines that a packet header of the fourth packet includes the node SID 105, and then considers that the packet needs to be processed by the network device 105. When processing the fourth packet, the network device 105 uses a device processing resource bound to the node SID 105. After processing the fourth packet, the network device removes the node SID 105 from the packet header of the fourth packet to restore the first packet, and then continues to forward the first packet based on an IP forwarding procedure.

In the embodiments shown in FIG. 2 to FIG. 5, the controller or the network device first generates a forwarding table corresponding to a network slice, and then generates a corresponding forwarding entry. In a possible implementation, the controller or the network device may directly generate a forwarding entry without generating a forwarding table. In this case, an index of the forwarding entry includes an identifier of the network slice and an IP address of a destination network device. Correspondingly, when forwarding a packet, a subsequent network device directly searches for the forwarding entry to implement packet forwarding.

In a possible implementation, the advertisement message is an open shortest path first (OSPF) link-state advertisement (LSA) or is an intermediate system-to-intermediate system (IS-IS) link state protocol data unit (LSP).

Figure 6:
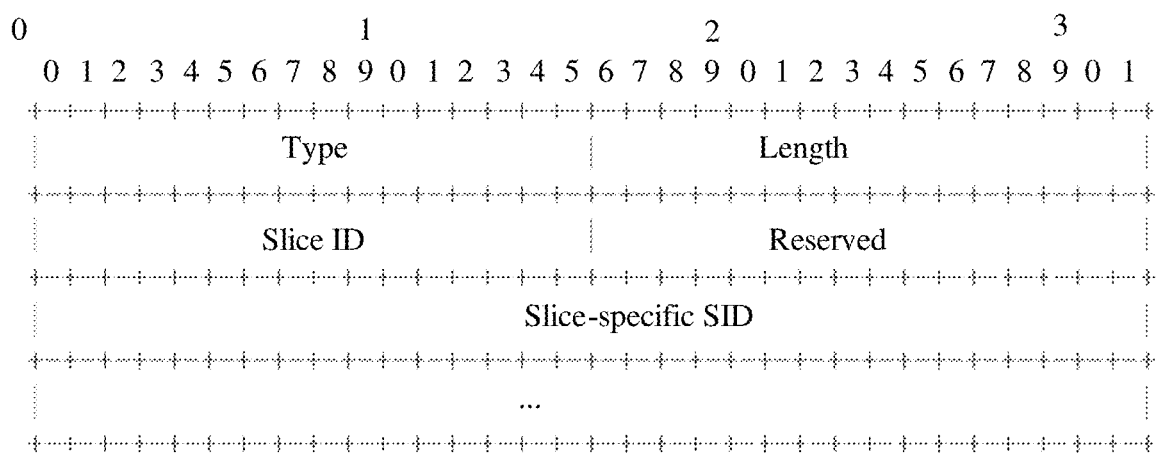
FIG. 6 is a schematic diagram of a sub-TLV packet according to an embodiment of the present disclosure.

In a possible implementation, a sub-type-length-value (sub-TLV) is defined in the OSPF LSA or the ISIS LSP. For a specific format, refer to FIG. 6.

A type field is used to identify that the sub-TLV carries a node segment identifier and/or an adjacency segment identifier of a corresponding network slice.

A length field is used to identify a length of a sub-TLV packet.

A slice identifier (ID) field is used to identify an identifier of a network slice carried in the advertisement message.

A reserved field is used for subsequent extension.

A slice specific SID is used to identify the node segment identifier and/or the adjacency segment identifier carried in the advertisement message.

It can be learned from the foregoing technical solution that when a packet enters a network slice through a network device, the network device selects a proper network slice by using a forwarding table, and forwards or processes the packet by using a resource of the network slice, and an intermediate node in the network slice does not need to be aware of network slice information related to the packet, so that packet forwarding is more flexible. In addition, a resource is allocated to the network slice, so that resource sharing based on a network slice can be implemented, and there is no need to reserve a resource based on each LSP. Therefore, the technical solution is no longer limited by a quantity of LSPs, and extensibility is higher, thereby meeting service requirements of more users in 5G.

Figure 7:
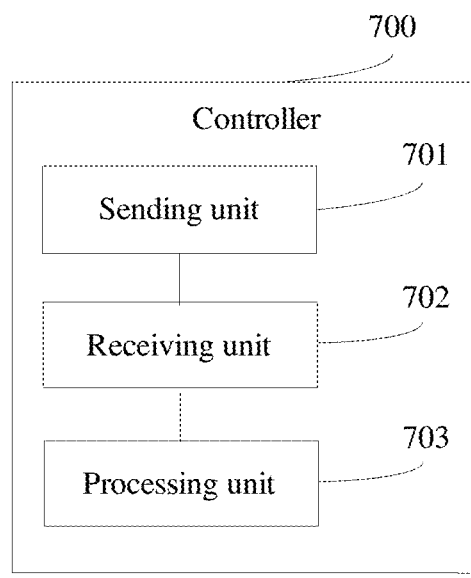
FIG. 7 is a schematic diagram of a controller according to an embodiment of the present disclosure.

Referring to FIG. 7, an embodiment of this application provides a forwarding entry generation controller 700, including: a sending unit 701 configured to send a plurality of resource allocation request messages to a plurality of network devices in a network slice, to trigger each of the plurality of network devices to allocate a resource based on a corresponding resource allocation request message, where the plurality of resource allocation request messages are in a one-to-one correspondence with the plurality of network devices, the resource allocation request message includes an identifier of the network slice and a resource that needs to be allocated by a corresponding network device to the network slice, and the resource includes a device processing resource and/or a link resource; a receiving unit 702 configured to receive a plurality of resource allocation response messages sent by the plurality of network devices, where the plurality of resource allocation response messages are in a one-to-one correspondence with the plurality of network devices, the resource allocation response message includes the identifier of the network slice and a segment identifier of a corresponding network device, the segment identifier is used to identify a resource allocated by the corresponding network device to the network slice, the segment identifier includes a node segment identifier and/or an adjacency segment identifier, and the resource allocated by each of the plurality of network devices belongs to the network slice; and a processing unit 703 configured to generate, based on the plurality of resource allocation response messages, a forwarding table corresponding to the network slice, where an identifier of the forwarding table is the identifier of the network slice, the forwarding table includes a forwarding entry for arriving at a network device in the network slice, and the forwarding entry includes a segment identifier of a network device on a path of arriving at a destination network device in the forwarding entry.

In a possible implementation, the controller 700 further includes: an obtaining unit configured to: before the sending unit sends the plurality of resource allocation request messages to the plurality of network devices in the network slice, obtain the network slice from a network based on a service requirement, where the network slice includes the plurality of network devices, and the service requirement includes a topology requirement and/or a requirement of a user on quality of service.

In a possible implementation, the sending unit 701 is further configured to send the forwarding table to a network device in the network slice.

The controller 700 is a network management device or is a controller in an SDN network architecture, and can implement functions related to the controller in the foregoing embodiment. For specific execution steps, refer to the foregoing method embodiment. Details are not described herein again.

Figure 8:
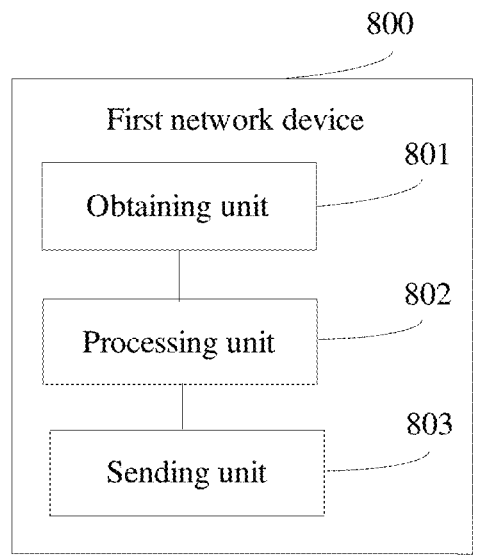
FIG. 8 is a schematic structural diagram of a first network device according to an embodiment of the present disclosure.

Referring to FIG. 8, an embodiment of the present disclosure provides a first network device 800 for generating a forwarding entry, including: an obtaining unit 801 configured to obtain a resource allocation request message, where the resource allocation request message includes an identifier of a network slice and a resource that needs to be allocated by the first network device to the network slice, and the resource includes a device processing resource and/or a link resource; a processing unit 802 configured to: allocate the resource based on the resource allocation request message, and allocate a segment identifier, where the segment identifier is used to identify the resource allocated by the first network device 800 to the network slice, the allocated resource belongs to the network slice, the allocated resource includes the device processing resource and/or the link resource, and the segment identifier includes a node segment identifier and/or an adjacency segment identifier; and a sending unit 803 configured to send an advertisement message to a second network device, to trigger the second network device to generate, based on the advertisement message, a forwarding table corresponding to the network slice, where the advertisement message includes the identifier of the network slice and the segment identifier, the forwarding table includes a forwarding entry for arriving at a network device in the network slice, and the forwarding entry includes a segment identifier of a network device on a path of arriving at a destination network device in the forwarding entry.

In a possible implementation, the first network device 800 further includes a receiving unit and a matching unit, where the receiving unit is configured to: receive the forwarding table sent by the second network device, and receive a first packet, where the first packet belongs to the forwarding table; the matching unit is configured to search the forwarding table for a matched forwarding entry based on a destination IP address of the first packet, where there is a correspondence between a destination IP address in the forwarding entry and the destination IP address of the first packet; the processing unit is further configured to insert the segment identifier in the forwarding entry into a packet header of the first packet to generate a second packet; and the sending unit is further configured to send the second packet to a network device corresponding to a next hop in the forwarding entry.

The first network device 800 may be a router, a switch, or a network device having a forwarding function. The first network device 800 can implement functions of the first network device in the foregoing embodiment. For specific execution steps, refer to the foregoing method embodiment. Details are not described herein again.

Figure 9:
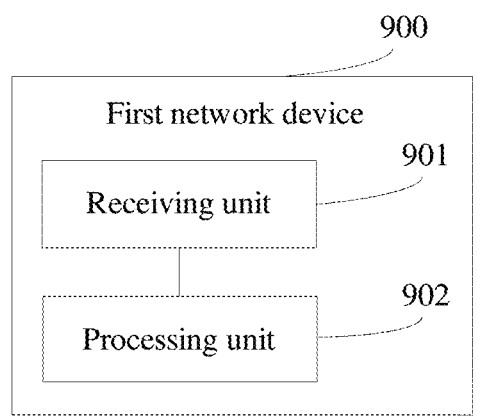
FIG. 9 is a schematic structural diagram of a first network device according to an embodiment of the present disclosure.

Referring to FIG. 9, an embodiment of the present disclosure provides a first network device 900 for generating a forwarding entry, including: a receiving unit 901 configured to receive a plurality of advertisement messages sent by a plurality of network devices in a network slice, where the plurality of advertisement messages are in a one-to-one correspondence with the plurality of network devices, the advertisement message includes an identifier of the network slice and a segment identifier of a corresponding network device, the segment identifier is used to identify a resource allocated by the corresponding network device to the network slice, the segment identifier includes a node segment identifier and/or an adjacency segment identifier, and the first network device is a network device in the network slice; and a processing unit 902 configured to generate, based on the plurality of advertisement messages, a forwarding table corresponding to the network slice, where an identifier of the forwarding table is the identifier of the network slice, the forwarding table includes a forwarding entry for arriving at a network device in the network slice, and the forwarding entry includes a segment identifier of a network device on a path of arriving at a destination network device in the forwarding entry.

In a possible implementation, the first network device further includes a receiving unit and a matching unit, where the receiving unit is configured to receive a first packet, where the first packet belongs to the forwarding table; the matching unit is configured to search the forwarding table for a matched forwarding entry based on a destination IP address of the first packet, where there is a correspondence between a destination IP address in the forwarding entry and the destination IP address of the first packet; the processing unit is further configured to insert the segment identifier in the forwarding entry into a packet header of the first packet to generate a second packet; and the sending unit is further configured to send the second packet to a network device corresponding to a next hop in the forwarding entry.

The first network device may be a router, a switch, or a network device having a forwarding function. The first network device can implement functions of the first network device in the foregoing embodiment. For specific execution steps, refer to the foregoing method embodiment. Details are not described herein again.

Figure 10:
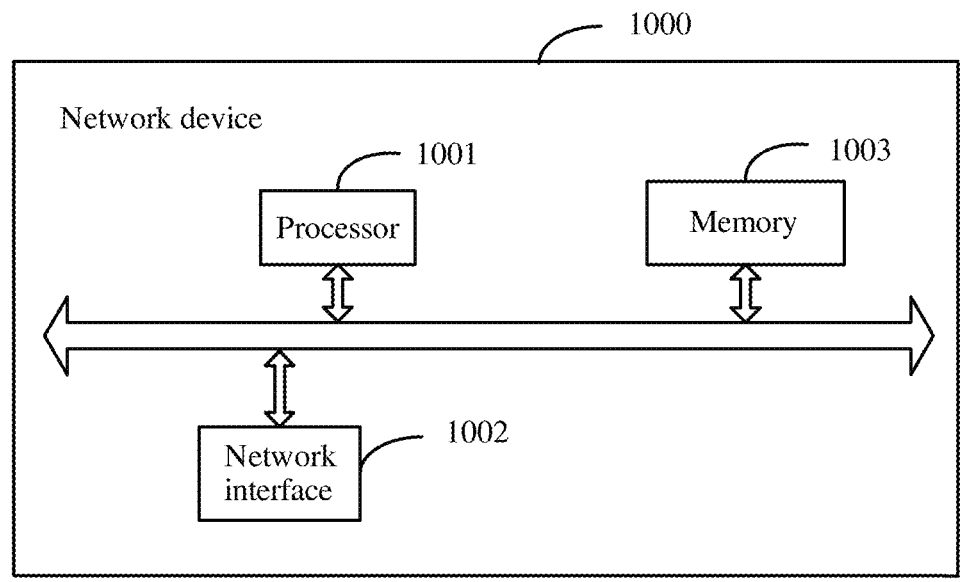
FIG. 10 is a schematic structural diagram of a network device according to an embodiment of the present disclosure.

Referring to FIG. 10, an embodiment of the present disclosure provides a network device 1000. The network device 1000 may be a router, a switch, or a network device having a forwarding function. The network device 1000 can implement functions of the controller or the first network device in the foregoing method embodiment. The network device 1000 includes a processor 1003, a network interface 1002, and a memory 1001. The memory may be configured to store program code and data of the network device, and the processor 1003 is configured to invoke a program instruction in the memory 1001, to perform the method in the foregoing method embodiment. For specific execution steps, refer to the foregoing method embodiment. Details are not described herein again.

Figure 11:
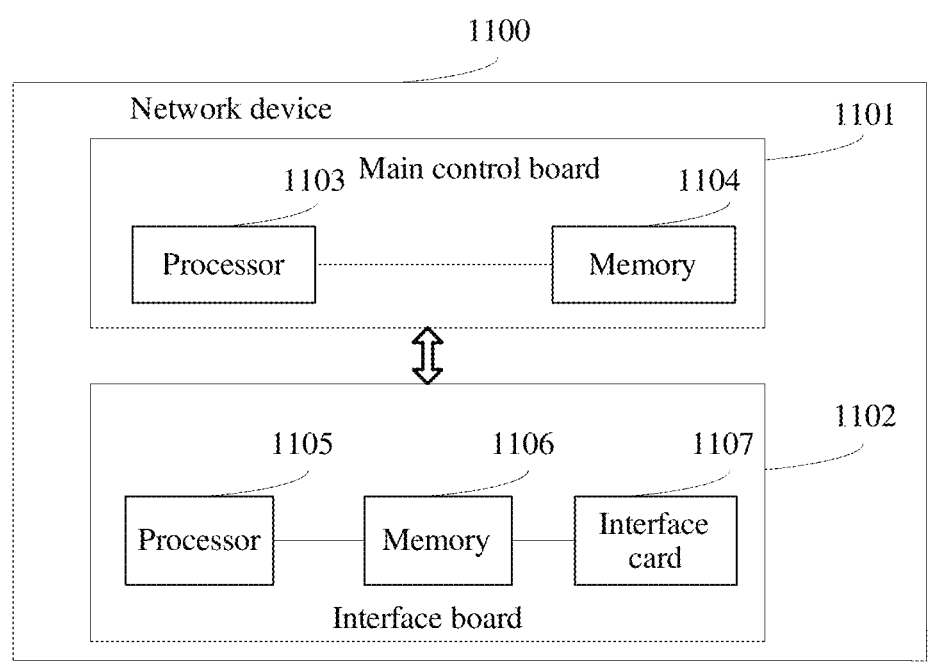
FIG. 11 is a schematic structural diagram of a network device according to an embodiment of the present disclosure.

Referring to FIG. 11, an embodiment of the present disclosure provides a first network device 1100. The first network device 1100 includes a main control board 1101 and an interface board 1102. The main control board 1101 includes a processor 1103 and a memory 1104. The interface board 1102 includes a processor 1105, a memory 1106, and an interface card 1107. The main control board 1101 is coupled to the interface board 1102.

The memory 1104 may be configured to store program code of the main control board 1101, and the processor 1103 is configured to invoke the program code in the memory 1104 to perform the following operations: obtaining a resource allocation request message, where the resource allocation request message includes an identifier of a network slice and a resource that needs to be allocated by the first network device 1100 to the network slice, and the resource includes a device processing resource and/or a link resource; and allocating the resource based on the resource allocation request message, and allocating a segment identifier, where the segment identifier is used to identify the resource allocated by the first network device 1100 to the network slice, the allocated resource includes the device processing resource and/or the link resource, the segment identifier includes a segment identifier and/or an adjacency segment identifier, and the allocated resource belongs to the network slice.

The memory 1106 may be configured to store program code of the interface board 1102, and the processor 1105 is configured to invoke the program code in the memory 1106 to perform the following operations: triggering the interface card 1107 to send an advertisement message to a second network device, to trigger the second network device to generate, based on the advertisement message, a forwarding table corresponding to the network slice, where the advertisement message includes the identifier of the network slice and the segment identifier, the forwarding table includes a forwarding entry for arriving at a network device in the network slice, and the forwarding entry includes a segment identifier of a network device on a path of arriving at a destination network device in the forwarding entry.

In a possible implementation, an inter-process communication IPC control channel is established between the main control board 1101 and the interface board 1102.

The first network device 1100 may be a router, a switch, or a network device having a forwarding function. The network device 1100 can implement functions of the first network device in the foregoing embodiment. For specific execution steps, refer to the foregoing method embodiment. Details are not described herein again.

An embodiment of the present disclosure further provides a computer storage medium configured to store a computer software instruction used by the first network device in the embodiment shown in FIG. 2, FIG. 3, or FIG. 4, where the computer software instruction includes a program used to perform the method in the foregoing method embodiment.

"First" in the first network device in the embodiments of the present disclosure is merely used as a name identifier, and does not mean being the first in a sequence. The rule is also applicable to "second".

Methods or algorithm steps described with reference to the content disclosed in the present disclosure may be implemented by hardware, or may be implemented by a processor by executing a software instruction. The software instruction may include a corresponding software module. The software module may be stored in a random-access memory (RAM), a flash memory, a read-only memory (ROM), an erasable programmable ROM (EPROM), an electrically erasable programmable ROM (EEPROM), a hard disk, a removable hard disk, a compact disc, or a storage medium in any other form well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When the present disclosure is implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or special-purpose computer.

The objectives, technical solutions, and beneficial effects of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A method implemented by a controller, the method comprising:
   sending a plurality of resource allocation request messages to a plurality of network devices in a network slice, wherein the resource allocation request messages are in a one-to-one correspondence with the network devices, wherein each resource allocation request message comprises a network slice identifier of the network slice and a needed resource that needs to be allocated by a corresponding network device to the network slice, and wherein the needed resource comprises a device processing resource or a link resource;
   receiving a plurality of resource allocation response messages from the network devices, wherein the resource allocation response messages are in a one-to-one correspondence with the plurality of network devices, wherein each resource allocation response message comprises the network slice identifier and a first segment identifier of a corresponding network device, wherein the first segment identifier identifies an allocated resource allocated to the network slice, and wherein the first segment identifier comprises a node segment identifier or an adjacency segment identifier; and
   generating, based on the resource allocation response messages, a forwarding table corresponding to the network slice,
   wherein a forwarding entry of the forwarding table comprises a second segment identifier of a network device on a path of arriving at a destination network device in the forwarding entry.

2. The method of claim 1, wherein before sending the plurality of resource allocation request messages, the method further comprises obtaining the network slice from a network based on a service requirement, and wherein the service requirement comprises a topology requirement or a requirement of a user on quality of service (QoS).

3. The method of claim 1, further comprising sending the forwarding table to one of the network devices.

4. The method of claim 1, wherein the device processing resource comprises a queue.

5. The method of claim 1, wherein the device processing resource comprises a memory.

6. The method of claim 1, wherein the device processing resource comprises a processor.

7. The method of claim 1, wherein the device processing resource comprises a network function.

8. The method of claim 1, wherein the link resource comprises a bandwidth.

9. The method of claim 1, wherein the link resource comprises a timeslot or a sub-interface.

10. A method implemented by a first network device, the method comprising:
    obtaining a resource allocation request message comprising a network slice identifier of a network slice and a needed resource that needs to be allocated by the first network device to the network slice, wherein the needed resource comprises a device processing resource or a link resource;
    allocating an allocated resource to the network slice and in response to the resource allocation request message, wherein the allocated resource comprises the device processing resource or the link resource;
    allocating a first segment identifier in response to the resource allocation request message, wherein the first segment identifier identifies the allocated resource and comprises a node segment identifier or an adjacency segment identifier; and
    sending an advertisement message to a second network device to trigger the second network device to generate a forwarding table corresponding to the network slice, wherein the advertisement message comprises the network slice identifier and the first segment identifier.

11. The method of claim 10, wherein the forwarding table comprises a forwarding entry for arriving at a network device in the network slice.

12. The method of claim 11, wherein the forwarding entry further comprises a second segment identifier of a network device on a path of arriving at a destination network device in the forwarding entry.

13. The method of claim 10, further comprising:
    receiving the forwarding table from the second network device;
    storing the forwarding table;
    receiving a first packet belonging to the forwarding table, wherein the first packet comprises a first destination Internet Protocol (IP) address and a packet header;
    searching the forwarding table for a forwarding entry comprising a second destination IP address that matches the first destination IP address;
    obtaining a third segment identifier from the forwarding entry;
    inserting the third segment identifier into the packet header to generate a second packet; and
    sending the second packet to a network device corresponding to a next hop in the forwarding entry.

14. A controller comprising:
    a network interface configured to:
        send a plurality of resource allocation request messages to a plurality of network devices in a network slice, wherein the resource allocation request messages are in a one-to-one correspondence with the network devices, wherein each resource allocation request message comprises a network slice identifier of the network slice and a needed resource that needs to be allocated by a corresponding network device to the network slice, and wherein the needed resource comprises a device processing resource or a link resource, and
        receive a plurality of resource allocation response messages from the network devices, wherein the resource allocation response messages are in a one-to-one correspondence with the plurality of network devices, wherein each resource allocation response message comprises the network slice identifier and a first segment identifier of a corresponding network device, wherein the first segment identifier identifies an allocated resource allocated to the network slice, and wherein the first segment identifier comprises a node segment identifier or an adjacency segment identifier; and
    a processor coupled to the network interface and configured to generate, based on the resource allocation response messages, a forwarding table corresponding to the network slice, and wherein a forwarding entry of the forwarding table comprises a second segment identifier of a network device on a path of arriving at a destination network device in the forwarding entry.

15. The controller of claim 14, wherein before sending the resource allocation request messages, the processor is further configured to obtain the network slice from a network based on a service requirement, and wherein the service requirement comprises a topology requirement or a requirement of a user on quality of service (QoS).

16. The controller of claim 14, wherein the network interface is further configured to send the forwarding table to one of the network devices.

17. A first network device comprising:
a processor configured to:
obtain a resource allocation request message comprising a network slice identifier of a network slice and a needed resource that needs to be allocated by the first network device, wherein the needed resource comprises a device processing resource or a link resource,
allocate an allocated resource to the network slice and in response to the resource allocation request message, wherein the allocated resource comprises the device processing resource or the link resource, and
allocate a first segment identifier in response to the resource allocation request message, wherein the first segment identifier identifies the allocated resource and comprises a node segment identifier or an adjacency segment identifier; and
a network interface coupled to the processor and configured to send an advertisement message to a second network device to trigger the second network device to generate a forwarding table corresponding to the network slice,
wherein the advertisement message comprises the network slice identifier and the first segment identifier.

18. The first network device of claim 17, wherein the network interface is further configured to receive the forwarding table from the second network device, wherein the processor is further configured to store the forwarding table, wherein the network interface is further configured to receive a first packet belonging to the forwarding table, wherein the first packet comprises a first destination Internet Protocol (IP) address and a packet header, wherein the processor is further configured to:
search the forwarding table for a forwarding entry comprising a second destination IP address that matches the first destination IP address;
obtain a third segment identifier from the forwarding entry; and
insert the third segment identifier into the packet header to generate a second packet, and
wherein the network interface is further configured to send the second packet to a network device corresponding to a next hop in the forwarding entry.

19. A first network device comprising:
a network interface configured to receive a plurality of advertisement messages from a plurality of network devices in a network slice, wherein the advertisement messages are in a one-to-one correspondence with the network devices, wherein each advertisement message comprises a network slice identifier of the network slice and a first segment identifier of a corresponding network device, wherein the first segment identifier identifies an allocated resource allocated by the corresponding network device to the network slice, and wherein the first segment identifier comprises a node segment identifier or an adjacency segment identifier; and
a processor coupled to the network interface and configured to generate, based on the advertisement messages, a forwarding table corresponding to the network slice,
wherein the forwarding table comprises a forwarding entry for arriving at a network device in the network slice, and
wherein the forwarding entry comprises a second segment identifier of a network device on a path of arriving at a destination network device in the forwarding entry.

20. The first network device of claim 19, wherein the network interface is further configured to receive a first packet belonging to the forwarding table, wherein the first packet comprises a first destination Internet Protocol (IP) address and a packet header, wherein the processor is further configured to:
search the forwarding table for a forwarding entry comprising a second destination IP address that matches the first destination IP address;
obtain a third segment identifier from the forwarding entry; and
insert the third segment identifier into the packet header to generate a second packet, and
wherein the network interface is further configured to send the second packet to a network device corresponding to a next hop in the forwarding entry.

* * * * *